No. 797,027. PATENTED AUG. 15, 1905.
J. A. TILDEN.
ART OF MEASURING FLUIDS.
APPLICATION FILED SEPT. 29, 1902.
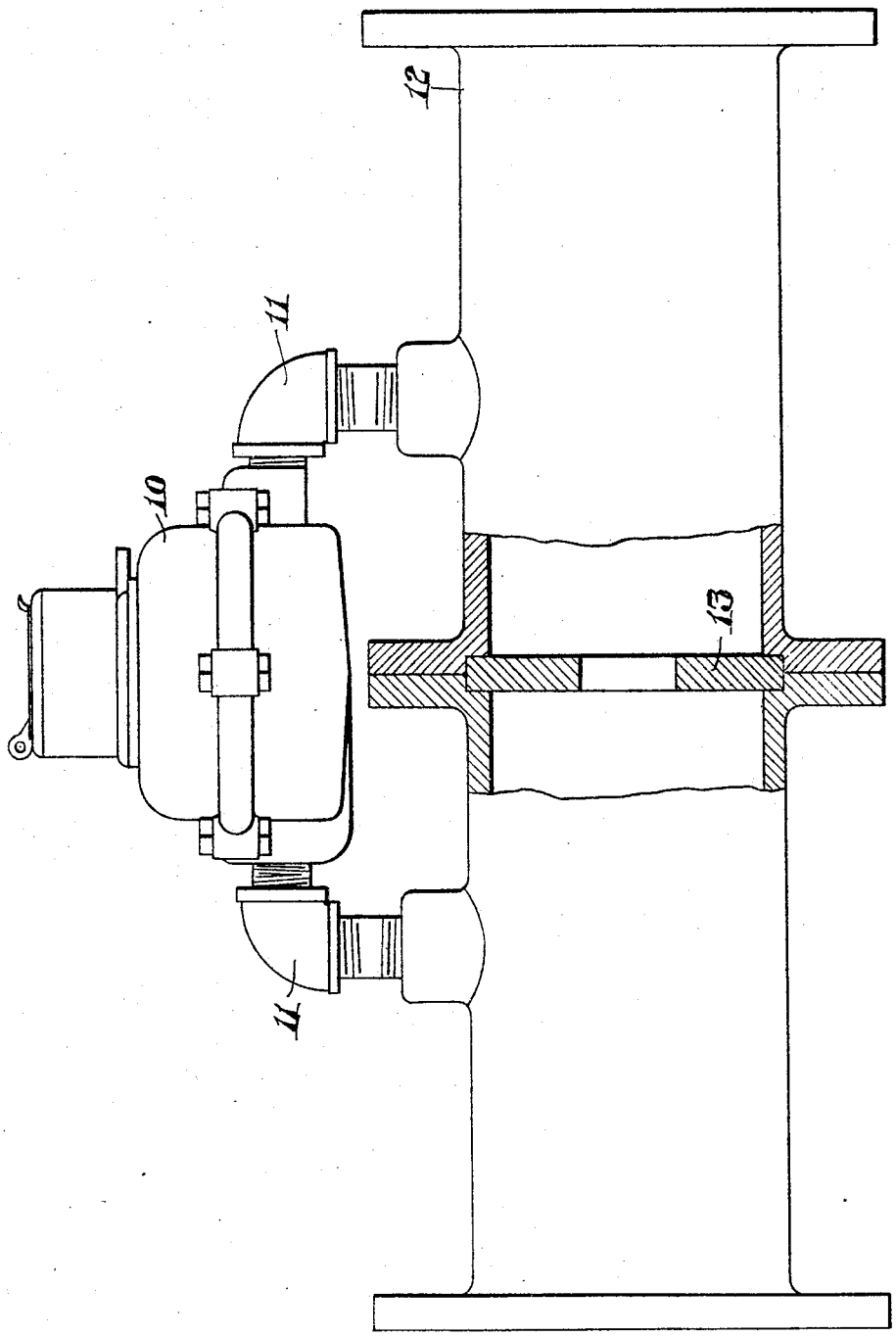
Witnesses:
Walter E. Lombard.
Ella M. Cobb.
Inventor:
James A. Tilden,
by [signature],
Atty.

UNITED STATES PATENT OFFICE.

JAMES A. TILDEN, OF HYDEPARK, MASSACHUSETTS, ASSIGNOR TO HERSEY MANUFACTURING COMPANY, OF SOUTH BOSTON, MASSACHUSETTS, A CORPORATION OF MAINE.

ART OF MEASURING FLUIDS.

No. 797,027.    Specification of Letters Patent.    Patented Aug. 15, 1905.

Application filed September 29, 1902. Serial No. 125,199.

*To all whom it may concern:*

Be it known that I, JAMES A. TILDEN, a citizen of the United States, residing at Hydepark, in the county of Norfolk and State of Massachusetts, have invented a new and useful Improvement in the Art of Measuring Fluids, of which the following is a specification.

My invention relates to the art of measuring fluids, and more particularly to that inferential method known as "proportional metering," having for its principal object the provision of such a method which shall furnish substantially accurate results under varying velocities of flow.

An apparatus through which my improved method may be carried out is illustrated diagrammatically in the accompanying drawing.

In attempts at proportional metering the most common practice heretofore has been to take off from each side of an intermediate resistance in the conduit, the flow through which is to be measured, a by-pass having a cross-sectional area bearing a known relation to the area of the main conduit, then to determine the quantity of water diverted through the by-pass by some form of meter, and finally to secure the total flow by multiplying the meter reading, either independently or within the meter itself, by the area of both conduits expressed in the by-pass area as a unit. In so doing it has been assumed that the proportionate division of the flow remained, for all practical purposes, constant under varying velocities. This assumption, however, is not justified, since it is well known that in any given conduit the coefficient of resistance varies for different velocities of flow therethrough and that in conduits presenting resistances of a different nature the coefficient will vary by different amounts between the same velocities. It is therefore evident that the proportionate flow in a main conduit and meter-conduit selected at random may change considerably under working conditions, and this variation proves sufficient to destroy the accuracy which should be attained. Attempts have been made to correct this error by providing in the main conduit between the ingress and egress openings of the by-pass various movable devices by which it is sought to alter the resistance with the velocity of flow, and thus maintain a constant proportion. These are not satisfactory, since even when in perfect operation they do not properly compensate for all the changes in velocity, and they are liable in use to lose any efficacy they originally possessed by the presence of obstructions and by wear.

In order to maintain a substantially constant proportionate distribution under the different rates of flow encountered in practice, I have discovered that it is necessary to provide conduits offering a resistance of a like character to the passage of the fluid, and what constitutes this similarity of character or harmony of resistance may be best stated in the following manner: The resistance to the flow of a fluid through a conduit may be expressed by the equation $v^n = Ch$, where $v$ represents the velocity of flow, $n$ some power thereof, $C$ a constant, and $h$ the loss of pressure or head due to the resistance encountered. It will be found that upon plotting a curve with a series of values of $h$ for the abscissa $x$ and of $v$ for the ordinates $y$ for any particular conduit one will be obtained more or less closely approaching a parabola, (the equation of which is $y^2 = cx$,) but usually slightly varying therefrom. If now a diagram is plotted with the logarithms of these coördinates instead of with the natural values, a substantially straight line will be obtained lying at different slopes for different kinds of resistances, the trigonometric tangent of which will furnish a measure of said slope, and therefore the exponent of $v$, that for the true parabola being of course 2 and those for the curves obtained in practice differing from it between limits which experiment shows to be about 1.75 and 2.1.

Now from the above it will be seen that if the resistance offered to the flow of fluids by two conduits is expressed by equations having different values of the exponent of $v$ the ratio between $v$ and $h$ for different values of $v$ must vary, but that, upon the contrary, if they are expressible by equations possessing the same exponent the ratio will be constant for all velocities. Therefore a resistance which may be represented by an equation having a certain exponent of $v$ may be said to have a definite character, while resistances presenting the same exponents in their equations may be said to have the same character as do the curves which they also represent—that having the exponent 2, for instance, being parabolic in character. In a resistance equation having a correct exponent of $v$ the value of $C$, which may be termed the "coefficient of resistance," will have a constant value for all velocities. In hydraulic practice, however, it is customary to fix the exponent as 2 in all cases and then take care of the error which is introduced by making the coefficient a variable. When such an equation is used, it will be seen that to cause it to represent resistances or curves of the same character it will be necessary that this variable coefficient should be the same for the same velocities under the varying rates of flow, as would of course also be the case when the equation was expressed with the correct exponent and the coefficient became a true constant.

The general arrangement of an apparatus illustrative of my method is shown diagrammatically in the drawing. Here the numeral 10 designates a suitable meter, which has been selected because it offers a resistance of a definite character to the fluid-flow. This character of resistance has been obtained by determining the loss of pressure or head in the meter for a series of rates of flow by measuring it by some suitable gage, as a differential manometer, and the velocity by the reading of the meter itself. Then with the logarithms of these readings in pounds per square inch and feet per second, respectively, as coördinates a series of points is plotted which will be found to lie along a practically straight line. The slope of this line is now determined by computing its tangent, giving a value for the exponent of $v$ in the resistance equation. The character of this meter resistance having thus been ascertained, it may be inserted in a by-pass 11 from a main conduit 12 and this latter provided at 13 with some form of resistance which has the same character, as hereinbefore defined, as the meter. The constancy of distribution having thus been secured, the total flow may be estimated in the usual manner. A main-conduit resistance may be secured to harmonize in character with a meter of a definite resistance, as well as the opposite course, and either the meter selected or the condition of the by-pass conduit changed to bring the resistance offered therein to the same character as that of the main conduit.

As an example of a particular form of apparatus by which my method may be successfully carried out in practice it may be stated that I have found that the commercial meter known as the "Hersey rotary" and the reverse-tapered ajutage commonly termed a "Venturi tube" each have practically the same exponent and give a substantially constant proportionate distribution for all velocities of flow to which they will be subjected.

Clearly the particular type of measuring device or of resistance employed in carrying out my method is not an essential feature thereof. It is merely necessary that the character of resistance as indicated by its equation shall be similar in both.

In the practical illustration of my invention assume that there is a twenty-four-inch main and it is desired to measure the flow under different conditions by the measurement of a portion only of the water delivered by said main. I create a resistance in said main by well-known means, as by a partition with a central opening, which resistance will be similar under all pressures and indicated by a known exponent. This involves only such factors as are well known to those skilled in the art. I then determine (or having determined) by practical experiment the character of resistance in by-passes, including meters of various types, and the different exponents of these different resistances, and after having determined the character of resistance in the main I select from the meters and by-pass structures, the exponents of which have been previously determined, one the exponent of which is the same as the exponent of resistance in the main, and I connect this by-pass with its meter to the main upon opposite sides of the partition, when the structure will be one in which the resistance in the by-pass part of the flow will be of precisely the same character as that in the main and the measurement by the meter of the flow through the by-pass under all heads will indicate proportionately the flow through the main.

Having thus described my invention, I claim—

In proportional metering, the method of rendering the flow through the branches of a divided stream proportionate under variations of flow, consisting in creating in one branch a resistance of determined character, and in providing a character of resistance in the other branch to correspond to that in the first, substantially as described.

JAMES A. TILDEN.

Witnesses:
FRANCIS C. HERSEY,
HENRY D. WINTON.